June 15, 1943.  W. R. TUCKER  2,322,200
INJECTION UNIT
Filed Oct. 24, 1940
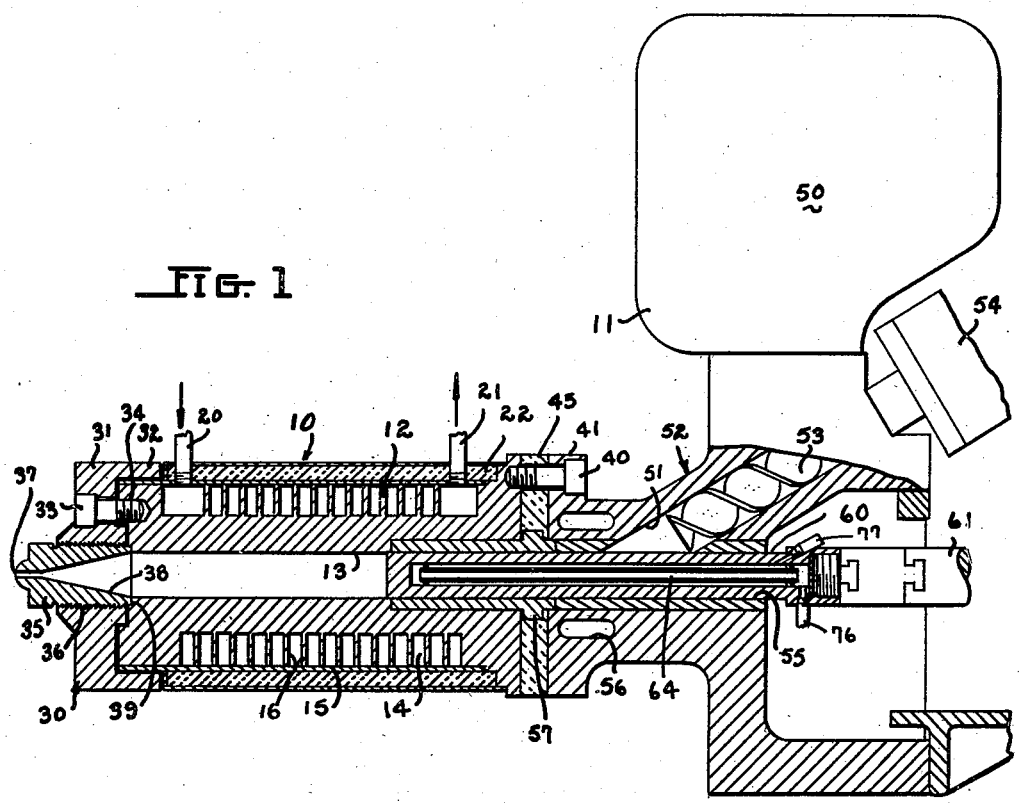
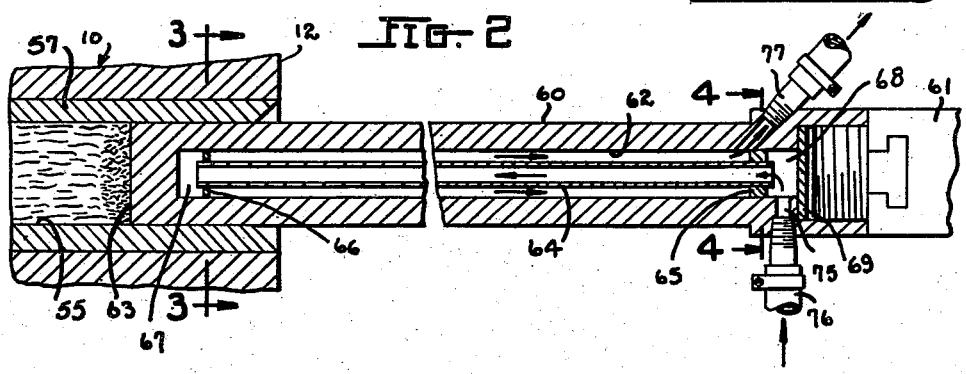
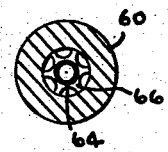
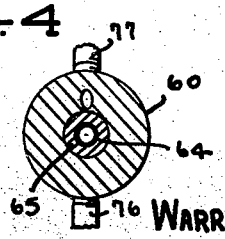
INVENTOR
WARREN R. TUCKER
BY
ATTORNEYS Patented June 15, 1943

2,322,200

UNITED STATES PATENT OFFICE 2,322,200

INJECTION UNIT

Warren R. Tucker, Dayton, Ohio, assignor to The Hydraulic Development Corp. Inc., Wilmington, Del., a corporation of Delaware Application October 24, 1940, Serial No. 362,627

2 Claims. (Cl. 18—30)

This invention relates to an apparatus for injection molding plastic material, and particularly to those materials which have a tendency to set if retained at elevated temperatures over prolonged periods of time.

When injection molding plastic materials the state of fluency of the material should be controlled within a certain range to prevent the material from becoming too fluent, in which state the material can flow between the injection plunger and the injection cylinder wall to cause damage to the plunger or wall, or in the case of materials which set under heat, can even cause the plunger to stick within the injection cylinder.

When injecting plastic materials which set under heat, such as the thermosetting resins, the injection apparatus must be constructed and arranged in a manner that material which becomes hardened in the injection cylinder for any reason can be easily removed.

Injection molding machines heretofore constructed have not been entirely successful in injection molding thermosetting resins, particularly because of the obstructions in the injection cylinder and nozzle arrangement, and because there has been no control over the state of fluency of the resin. An exact control over the state of fluency over a thermosetting resin has not been commercially practical, since the thermosetting resins have a tendency to become extremely fluent once they have been softened to a state at which they can be injection molded. It seems that once the thermosetting plastic materials become soft enough for injection molding that the fluency of the material gets out of hand and goes into an extremely fluent state. When the resin is in this condition it is of such fluency that it can enter the small space between the injection plunger and the wall of the injection cylinder whereby the injection plunger has been caused to freeze within the injection cylinder.

It is thus an object of this invention to provide an injection molding unit which will have an unobstructed passageway through the injection cylinder.

It is another object of the invention to provide an injection unit wherein the state of fluency of the plastic material adjacent the injection plunger is controlled to an extent which prevents the material from flowing into the space between the plunger and the wall of the injection cylinder.

It is another object of the invention to provide an injection unit wherein means are provided for causing the plastic material adjacent the end of the injection plunger to assume a more viscous condition than the remaining body of material within the injection cylinder.

It is another object of the invention to provide a cooled injection plunger which will thereby retain the plastic material adjacent the end thereof in a less fluent condition than the remaining body of material within the injection cylinder.

It is another object of the invention to provide a fluid cooled injection plunger.

It is another object of the invention to provide an injection unit wherein the nozzle of the injection unit is readily removable to permit cleaning of the nozzle and injection cylinder.

It is another object of the invention to provide an injection cylinder having a substantially constant internal bore.

It is another object of the invention to provide an injection unit wherein the nozzle of the injection cylinder is removable, and when removed from the cylinder, the cylinder will present a substantially constant bore throughout its entire length.

It is another object of the invention to provide an injection unit wherein the injection cylinder has a straight through passage for movement of the plastic material therethrough.

It is another object of the invention to control the fluency of a certain portion of the body of plastic material within the injection cylinder.

It is another object of the invention to provide a plastic injection unit wherein the state of fluency of different portions of the body of material therein is maintained in different conditions.

It is another object of the invention to provide a plastic injection unit wherein the principal body of material therein is heated to a temperature for injection molding while a small portion of the body is cooled to a temperature below that required for injection molding.

Further objects and advantages will be apparent from the description and the drawing:

In the drawing:

Figure 1 is a vertical cross-sectional view through a plastic injection and feeding unit, the feeding unit being shown in elevation;

Figure 2 is an enlarged cross-sectional view of the fluid cooled injection plunger shown in process of an injection stroke;

Figure 3 is a cross-sectional view taken along line 3—3 of Figure 2;

Figure 4 is a cross-sectional view taken along line 4—4 of Figure 2.

In this invention the injection unit consists of an injection cylinder 10 which is secured to a feeding unit 11. The injection cylinder 10 consists of a cylindrical body 12 having a uniform internal cylinder bore 13. The outer periphery of the body 12 is under-cut with a spiral groove 14. A metal cylinder 15 encloses the body 12, the fins 16 provided between the spiral grooves 14 engaging the cylinder 15. The cooperation of the grooves 14, the fins 16 and the cylinder 15 provides a spiral passageway around the periphery of the body 12 of the injection cylinder through which a heating fluid is circulated. A fluid inlet 20 is provided at the forward end of the injection cylinder body 12 and communicates with the passage 14. A discharge outlet 21 is provided at the rear end of the injection cylinder body 12, and also communicates with the fluid passage 14. The fluid passage 14 is spirally shaped to provide a continuous fluid passage around the periphery of the body 12 from the inlet 20 to the outlet 21. A heat insulating cylinder 22 is positioned around the cylinder 15 to retain the heat within the injection cylinder body 12.

A nozzle 30 is positioned adjacent the forward end of the cylinder body 12. The nozzle 30 consists of a substantially cup-shaped member 31 which has a flange 32 extending adjacent the cylinder 15, and extending over the end wall of the cylinder body 12. The body 31 is provided with a plurality of openings therethrough through which machine screws 33 extend into engagement with threaded openings 34 provided in the end wall of the cylinder body 12. The nozzle body 31 carries an injection nozzle 35 which is retained in the body 31 by means of the threaded engagement 36. The nozzle 35 is provided with a small bore 37 through which material is ejected into a suitable mold when the nozzle 35 is in engagement therewith. The bore 37 is enlarged into a conical bore 38 which extends rearwardly of the nozzle 35, the extreme end of the conical bore 38 being of the same diameter as the internal cylinder bore 13 of the injection cylinder 10.

The injection nozzle 35 is provided with a sealing shoulder 39 which engages the end of the cylinder body 12 to seal the injection passageway and align the nozzle coaxially therewith, the machine screws 33 providing means for retaining the nozzle in sealing engagement with the end of the cylinder bore 12.

The injection cylinder 10 is retained in position upon the feeding unit 11 by means of the machine screws 40 which extend through a flange 41 provided upon the body of the feeding unit 11 and into engagement with the rear end of the injection cylinder 10. A heat insulating pad 45 is positioned between the injection cylinder 10 and the feeding unit 11 to prevent transfer of heat from the injection cylinder to the feeding unit.

The feeding unit 11 consists of a metal hopper 50 which communicates with an angular bore 51 provided in the body 52 of the feeding unit. A helical feed screw 53 extends through the bore 51 and is suitably connected to a driving motor 54. The driving motor 54 may be controlled in a suitable manner for cyclic operation for feeding material into the cylinder bore 13 of the injection cylinder 10. An internal bore 55 is provided within the body 52 of the feeding unit 11. This bore is of the same diameter as the internal cylinder bore 13 of the injection cylinder 10. The feed passageway 51 communicates with the internal bore 55 when the injection plunger 60 is in the retracted position, in which position the end of the injection plunger is adjacent the rear end of the feed bore 51.

A fluid pasage 56 is provided around the throat of the body 52 of the feed unit 11. A cooling fluid is circulated through this passageway to absorb any heat which is transferred from the injection cylinder 10, whereby the material within the body 52 of the feed unit is retained at a temperature below that for plastic injection.

An insert member 57 is provided between the feed unit 11 and the injection cylinder 10 to span the space occupied by the heat insulating pad 45. This insert 57 is provided with an internal bore of the same diameter as the internal bore 13 of the injection cylinder 12.

Since the internal bore of the feed passage 55, the insert 57 and the injection cylinder bore 13 are all a constant bore, or substantially so, it may be seen that material fed into the bore 55 from the feeding bore 51 will be moved through a series of communicating bores in a straight through manner. That is, the bores comprising the cylinder for the plunger 60 are all of uniform diameter so that material moving through the respective bores is maintained at a substantially uniform diameter. This condition exists to the extreme forward end of the injection cylinder bore 13. When the plunger 60 forces material forwardly within the cylinder bore 13 the material enters the conical shaped bore 38 of the nozzle 35 and is expelled through the nozzle bore 37.

When the nozzle 30 is removed from the end of the injection cylinder 10, it can readily be seen that the unobstructed passageway is provided of substantially continuous and uniform diameter throughout the length of the passageway. This arrangement permits material to be ejected from the cylinder bore 13 by means of the plunger 60 should the material become hardened within the bore 13.

The plunger 60 is connected to a hydraulically actuated plunger 61, which plunger is operated in conventional manner by means of a hydraulic motor, controls for which are of conventional nature and are well-known in the plastic injection machine art.

The plunger 60 is a fluid cooled plunger and is provided with an internal bore 62 extending closely adjacent the forward end 63 of the plunger. A tube 64 is positioned substantially centrally within the bore 62. The tube is supported at the rear end thereof by means of a solid collar 65 and at the forward end thereof, adjacent the forward end wall 63, by means of a spider shaped member 66. The tube 64 is somewhat shorter in length than the bore 62 so that the positioning of the collar 65 and spider 66 are such as to provide a forward chamber 67 and a rear chamber 68 within the plunger 60. The rear chamber 68 is closed by means of a disk 69 which is suitably attached adjacent the end of the bore 62.

The chamber 68 provides a fluid inlet chamber into which fluid is directed through a passage 75 which is in communication with a fluid line 76 through which a cooling fluid enters the chamber 68. Since the collar 65 is solid the fluid entering the chamber 68 will pass within the central bore of the tube 64, and forwardly toward the chamber 67 within the forward end 63 of the plunger 60. The fluid, upon entering the chamber 67, will be in thermal contact with the end 63 of the plunger 60 thereby cooling the same. The fluid will return through the spider 66 and between the tube 64 and the bore 62 to the discharge outlet 77. The cooling fluid may be circulated continuously through the plunger 60, or may be intermittently circulated, if such an arrangement should be desirable. The cooling fluid may either by a liquid or an expanding gas, depending upon the degree of cooling required by the plunger 60.

The cooling of the plunger 60 will maintain the end 63 of the plunger, as well as the body thereof, at a temperature lower than the temperature of the injection cylinder 10. It may thus be seen that any plastic material adjacent the end 63 of the plunger 60 will be retained at a temperature lower than the remaining body of the material which is in advance of that portion which is adjacent the end 63. Since the temperature of the material adjacent the end of the plunger 63 is retained at a lower temperature than the remaining body of material the fluidity of the material will be less, or the viscosity greater, than the material in advance of the portion adjacent the end of the plunger. The material adjacent the end 63 being of a more viscous nature, or less fluid nature, will be less likely to enter the space between the plunger 60 and the cylinder bore 13. In fact the material adjacent the end 63 of the plunger 60 will form a barrier of viscous material which will prevent the entrance of more fluid material, in advance thereof, into the interstices between the plunger and the cylinder wall 13.

When the injection unit is operating the plunger 60 will be retracted into a position wherein the end 63 will be adjacent the rear edge of the feed opening 51. The plunger 60 has been retracted by means of the hydraulically actuated plunger 61 under suitable control of a hydraulic motor. The feed motor 54 is then actuated to cause rotation of the feed screw 53, whereby a predetermined quantity of granular material is fed into the bore 55 of the feed until 11. The quantity of material fed by the screw 53 is controlled by the period of operation of the motor 54, which motor is controlled by conventional apparatus well-known in the plastic injection machine art. Material which has previously been advanced into the cylinder bore 13 by means of a previous injection stroke will be elevated in temperature during this period. The injection plunger is then caused to move through a feed stroke by means of the hydraulically actuated plunger 61. While the plunger 60 is advancing through its forward stroke, material heated within the cylinder bore 13 will be ejected through the nozzle opening 37. Since the material within the cylinder bore 13 will heat very rapidly the granular material advanced by the plunger 60 will be heated as it is advanced through the cylinder bore 13.

The material advanced by the plunger 60 into the cylinder bore 13 becomes extremely fluid under certain conditions. The extreme fluidity of plastic materials is particularly noticeable with thermosetting resins, since it is the nature of these resins that once they have been elevated to a temperature at which they can be ejected from an injection cylinder, the material immediately goes into a state of fluidity which is extremely thin and hard to handle. Accurate control of the exact temperature of thermosetting resins is extremely hard to accomplish because of this peculiar nature of the resins. When the fluidity of the resin is too high, regardless of whether it is a thermosetting or a thermoplastic resin, the material will flow into the interstices between the plunger and the cylinder wall, thereby causing trouble. In the case of the thermoplastic resins, the cylinder wall and the injection plunger become galled, while in the case of thermosetting resins the plunger freezes within the injection cylinder, the freezing being caused by the setting of the resin under continued application of heat.

It is therefore essential that the fluidity of the material, at least in advance of the forward end of the plunger 60, shall be controlled to an extent which prevents the material adjacent the end of the plunger from reaching a state of fluidity which causes the aforementioned trouble. The cooling fluid circulating through the plunger 60 will retain the end 63 thereof at a sufficiently low temperature that the plastic material adjacent the end will always be retained at a sufficiently low temperature that the state of fluidity thereof cannot reach extremely thin proportions. This body of material in advance of the end of the plunger acts as a barrier to the remaining body of the material within the injection cylinder 13, and prevents extremely fluid material from entering the space between the plunger and the cylinder wall.

Since the material adjacent the end 63 of the plunger 60 has never reached an approximate temperature for plastic injection molding, the material is still available for use upon subsequent heating. This is true for both the thermoplastic and thermosetting resins.

It may thus be seen that I have provided a means whereby the fluidity of a certain portion of the body of plastic material within an injection cylinder can be controlled to an extent which prevents the material from becoming extremely fluid, and prevents other material which is fluid from entering the space between the plunger and the cylinder wall.

In addition to the aforementioned troubles encountered with the use of the thermosetting resins, there are times when the plastic material will be within the injection cylinder for a prolonged period of time, thereby causing the material to set within the injection cylinder and within the nozzle thereof. Any delay in the functioning of the machine would cause the above result, such as a prolonged period of time in releasing the work piece formed in the mold or in case of some faulty operation of the injection machine itself. In any event, it is necessary that the hardened slug of material, when using thermosetting resins, shall be removed from the ejection cylinder and from the ejection nozzle.

To provide for such removal of such hardened slugs of material, the ejection nozzle of my invention is readily removable from the end of the ejection cylinder 10. The machine screws 33 are removed from their position and the nozzle 30 can then be removed from the ejection cylinder 10. Upon removal of the nozzle 30, the interior thereof may be readily cleaned, since the shape of the nozzle is such that a hardened slug can be forced rearwardly of the nozzle, the cone shaped opening 39 permitting the ejection of the hardened slug when forced rearwardly by the admission of some instrument through the opening 37.

When the ejection nozzle 30 is removed from the end of the injection cylinder 10, the internal cylinder bore 13 is open to the atmosphere. As heretofore described, this internal bore is of substantially constant diameter throughout its entire length. Hence, the injection machine can be caused to pass through an injection stroke, whereby the plunger 60 will be forced in a forward direction. Since the internal bore is of substantially constant diameter, the hardened slug of material will be of the same diameter, and can be easily forced forwardly through the open end of the cylinder bore 13, whereby the injection cylinder 10 is cleaned of hardened material.

The nozzle 30 is then replaced upon the injection cylinder 10 and the machine is ready for further cycling operation.

It is thus seen that I have provided by my invention an injection machine which is particularly adaptable for use with thermosetting resins, since I provide an unobstructed passageway within the injection cylinder 10, and construct the passageway in a manner that permits forward movement of a hardened slug of material when forced forwardly by means of the injection plunger. I have further provided means for controlling the fluidity of at least a portion of the body of material within the injection cylinder bore 13, which prevents at least a portion of the body of material from reaching a high state of fluidity, thereby eliminating damage to the plunger and cylinder wall and preventing the plunger from becoming stuck within the injection cylinder.

Having thus fully described my invention, what I claim as new and desire to secure by Letters Patent, is:

1. An injection molding apparatus for injection molding plastic materials such as thermosetting and thermoplastic resins comprising, an injection cylinder, an injection plunger movable in said injection cylinder, means for heating the interior of said cylinder to thereby heat plastic material contained therein, and means for maintaining that portion of the heated material which is immediately adjacent the end of said plunger at a comparatively low temperature and below plastic injection temperature, said last named means including means for conducting cooling fluid into direct contact with the forward end of said plunger, comprising a central bore in said piston, a tube in said central bore having means for spacing the same from said piston walls, whereby the incoming cooling fluid is conducted into direct contact with the forward end of said plunger while it is prevented from contacting the cylindrical side walls of said plunger until after it has contacted the forward end of said plunger.

2. An injection molding apparatus for injection molding plastic materials such as thermosetting and thermoplastic resins, comprising, an injection cylinder, an injection plunger movable in said injection cylinder, means for heating the interior of said cylinder to thereby heat plastic material contained therein, and means for maintaining that portion of the heated material which is immediately adjacent the end of said plunger at a comparatively low temperature and below plastic injection temperature, said last named means including means for conducting cooling fluid into direct contact with the forward end of said plunger, comprising a central bore in said piston, a tube in said central bore having means for spacing the same from said piston walls, whereby the incoming cooling fluid is conducted into direct contact with the forward end of said plunger while it is prevented from contacting the cylindrical side walls of said plunger until after it has contacted the forward end of said plunger, and means for conducting cooling fluid along the cylindrical side walls of said central bore after said fluid has contacted said forward end.

WARREN R. TUCKER.